July 31, 1962 — T. R. FOLSOM ETAL — 3,047,721
DIRECTIONAL GAMMA RAY DETECTION UNIT
Filed Sept. 1, 1959 — 3 Sheets-Sheet 1

INVENTORS
THEODORE R. FOLSOM
JOHN D. ISAACS
BY W. Glenn Jones

July 31, 1962  T. R. FOLSOM ETAL  3,047,721
DIRECTIONAL GAMMA RAY DETECTION UNIT
Filed Sept. 1, 1959  3 Sheets-Sheet 2
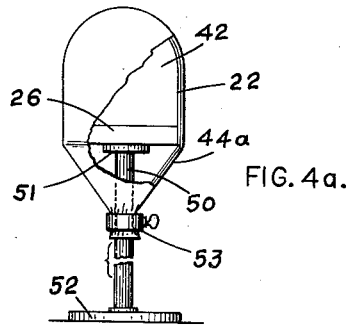
FIG. 4a.
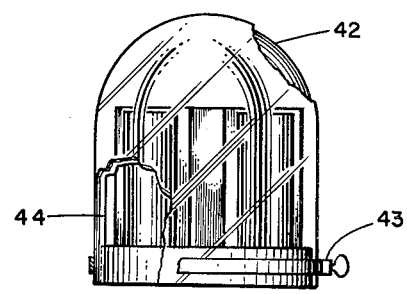
FIG. 4.
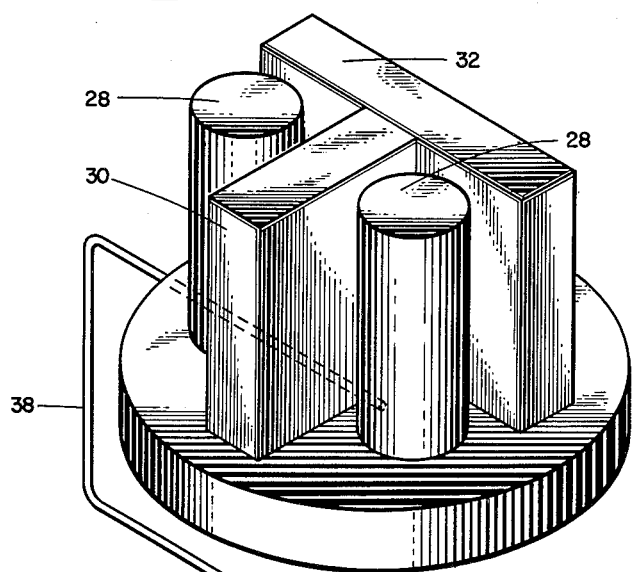
FIG. 3.
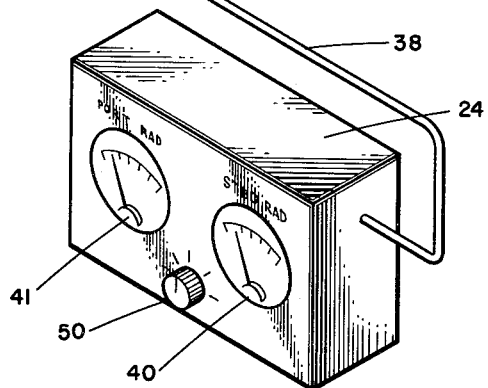
INVENTOR.
THEODORE R. FOLSOM
JOHN D. ISAACS
BY

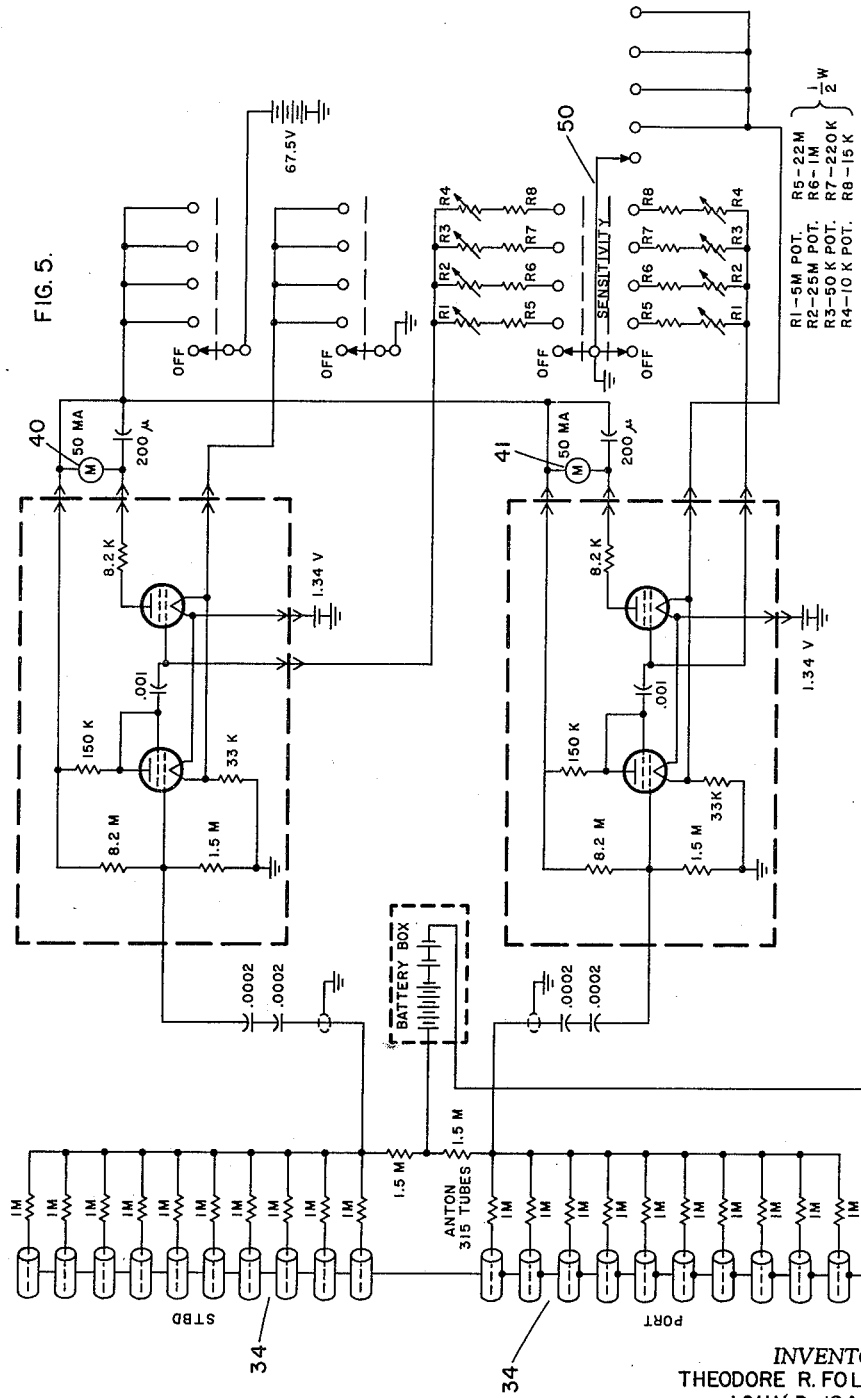

3,047,721
DIRECTIONAL GAMMA RAY DETECTION UNIT
Theodore R. Folsom, La Jolla, and John D. Isaacs, Encinitas, Calif., assignors to the United States of America as represented by the Secretary of the Navy
Filed Sept. 1, 1959, Ser. No. 837,559
6 Claims. (Cl. 250—83.3)

This invention relates to the detection of radioactive emanations and is particularly concerned with the detection of gamma rays from portions of a body of water that have been contaminated as a result of the explosion of radioactive materials.

In connection with various nuclear detonations that have been set off in or near large bodies of water, extensive mapping and surveying of the surrounding areas of water have been made to indicate the spread of radioactive materials through the fluid mediums involved. Various instruments for surface and sub-surface observations were devised and used successfully.

It was found, however, that some general means of rapidly determining and locating radioactive patches or portions of the seas being surveyed was necessary in order to institute the slower and more accurate observations utilizing surface and sub-surface instruments. It was also found necessary to provide a general means to positively indicate the presence of radioactive contaminated water which possessed too great an intensity of radioactive substances for safe observation.

The purpose of this invention, therefore, is to supply a radiation detector system which will indicate directionally the presence of radioactive materials in water with a measure of the intensity.

Another object of this invention is to provide vessels cruising in the vicinity of nuclear detonations with efficient means of detecting harmful areas, i.e., areas of water having an intensity of radiation harmful to man.

A further object of our invention is to provide a means for detecting radioactive fall-out and measuring its intensity.

Other and further objects and advantages of our invention will appear in conjunction with the following description and drawings wherein:

FIG. 3 is a view in perspective of our invention;

FIG. 4 is a view of the detector unit with its protective cover;

FIG. 4a shows a modified form for installation of the detector unit and its protective cover; and FIG. 5 is a schematic wiring diagram of the detector and indicating unit.

Figure 1:
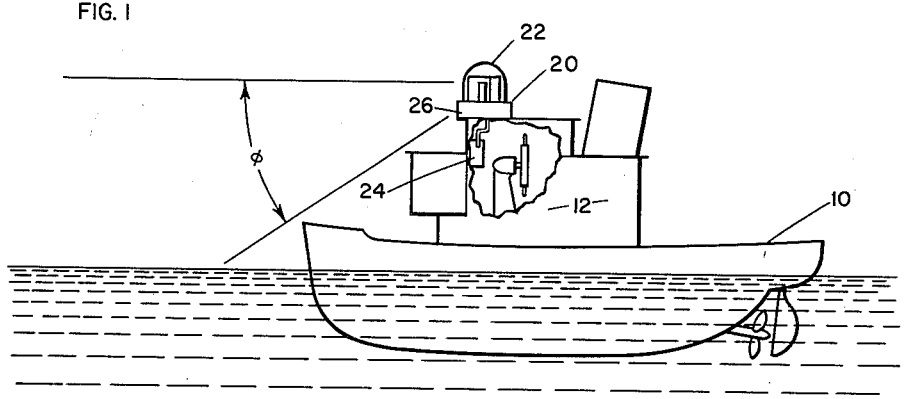
FIGURE 1 is a side view, partly broken away, of a tug or other water-borne vessel bearing our invention.

FIG. 1 discloses a survey type vessel 10 having a conventional wheelhouse 12 on which, to provide an unobstructed view of the forward horizon, is mounted the detector portion 22 of our directional gamma ray detection unit 20. The indicator portion 24 is shown installed inside the wheelhouse 12 adjacent the helmsman's station. It will be noted that the heavy shield base 26 is of such dimensions and is so installed that the angle of reception $\phi$, measured downwardly from the horizontal, is such as to clear the bow of the vessel, thereby obviating any possible response from the vessel itself due to accumulation of radioactive fallout or to radioactive material being present on the hull. This latter instance might occur where the vessel has recently passed through radioactive waters. When the hull is encrusted with marine growth, such radioactive material may remain for a considerable time before being dissipated.

Figure 2:
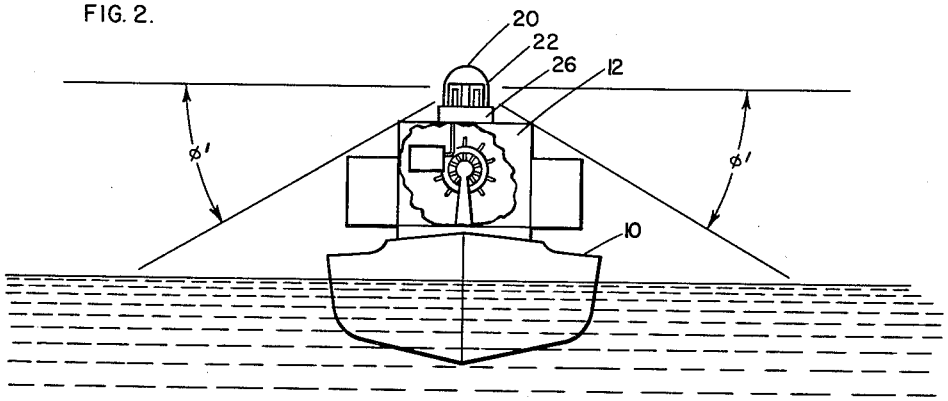
FIG. 2 is a front view, partly broken away, of the vessel shown in FIG. 1.

FIG. 2 illustrates the location of the detector portion 22 with relation to the fore-and-aft line of the vessel. Normally, the detector unit's base shield is so dimensioned and located that the angle of reception $\phi'$ for the athwartships detection is approximately equal to the forward angle $\phi$ as shown in FIG. 1. Actually, however, angles $\phi$ and $\phi'$ may be of any desired degree so long as the detector unit is shielded from any radiation effects emanating from the vessel's hull.

The detector portion 22 is shown in more detail in FIG. 3. This portion consists primarily of two sensing elements 28, the base shield 26, a fore-and-aft shield 30, and an athwartships shield 32. The various shields are constructed of lead or can be constructed of any other material having the properties of opaqueness to radioactive radiations, particularly gamma rays. As can be seen, this shielding forms two pockets which are open to one or the other of the two forward space quadrants, similar to certain types of navigational running lights. The sensing elements located in these pockets are thus susceptible to gamma radiation coming from a single quadrant but are shielded from any such radiation emanating from the ship or vessel. While the base shield 26 is shown as circular in cross-section, it may be any desired geometrical configuration so long as it assists in the proper shielding of the sensing elements from radioactive radiations from the ship or vessel itself.

The sensing elements 28 are shown as cylindrical containers 34 enclosing a plurality of radiation detection elements 36. The containers may be of plastic or thin metal and may be cylindrical, as shown, or may be of any other suitable configuration.

The detection elements 36 (FIG. 5) enclosed in the containers 34 may be Anton No. 315 G-M tubes or other similar detection elements. Any other suitable gamma ray detector could be employed. These elements, with reference to the Anton tubes, are arranged symmetrically with respect to the vertical axis of the container and are wired in parallel. Each sensing element is connected to the indicator portion 24; these connections are made into a shielded cable 38 which leads from the detector portion 22 to the indicator portion 24.

As shown in FIG. 5, the output from each of the sensing elements is amplified and fed into a microammeter 40 and 41. As shown in FIG. 3, these microammeters become the starboard and port indicators.

Sensitivity control 50 comprises a range selector for four different ranges of radioactivity, i.e., step-wise from 0.1 to 500 micro roentgens per hour. As shown in FIG. 5, control 50 comprises a double element 4-stage switch connecting the pairs of resistors R1–5, R2–6, R3–7, and R4–8 into their respective circuits. The variable resistors R1, 2, 3, and 4 are provided to adjust circuit response so that when the source of gamma rays lies directly ahead of the vessel, both indicating meters will show equal deflections.

FIGURE 5 shows the circuitry as actually used in the operating device. Certain component values are given but it is understood that these may be changed as may be necessary to properly amplify and indicate the output from the detector tubes actually used in any particular installation. Meters 40 and 41 may be replaced by other suitable indicating means such as recording meters, lights or even audible indicators.

In the unit as actually used, the lead shielding was 2 inches thick, the diameter of the base shield 26 was approximately 12 inches, and each of the containers 34 contained 14 Anton tubes connected in parallel.

As shown in FIG. 4, the detector portion 22 is encased in a plastic cover 42 held in place by circular clamp 43. As indicated at 44, the plastic cover 42 comprises a plurality of covers, the basic or inner cover may be of a heavy gauge transparent plastic or glass, whereas the outer covers consist of a plurality of thin flexible plastic covers which may be removed, one at a time. Thus, at any particular time, the indicating meters may register an equal level of radiation intensity. This reading may indicate a source of gamma rays directly ahead of the vessel or may otherwise indicate the presence of radioactive fallout on the cover 42. If, when the outer thin plastic cover is removed, the indicator drops back to zero, radioactive fallout was or is present. The magnitude of the meter reading is a measure of such fallout. If the meter indication does not change, it of course means that the source of gamma ray radiation lies directly ahead. As soon as the last thin cover or envelope is reached, it is removed and a new set of covers is immediately placed over the basic or inner cover.

FIG. 4a illustrates another type of installation for the detector unit 22. The latter is placed on top of a pedestal arrangement consisting of a column 50, a top plate 51, and a base portion 52. The thin plastic covers 44a are longer and extend well down past the base shield 26. They may then be gathered in and secured by clamp 53 around the column 50. This type of installation is particularly useful in the presence or proximity of windborne radioactive dust or spray. These extensive covers prevent such dust or spray from seeping in around the joint of the basic cover 42 and the base shield 26.

While one embodiment of our invention has been particularly described and shown, it is to be understood that the configuration of the various components, the elements used, and the circuitry may be modified to suit the circumstances of operation without departing from the spirit of the invention. It should be further understood that, while our invention has been described as being used with a survey type of vessel, it could be used on any type of vessel or vehicle for detecting and avoiding radioactive areas whether on water or land. Such device could well be used in military tanks to detect and avoid any harmful radioactive area resulting from the detonation of atomic bombs.

Having thus described and illustrated our invention, we claim:

1. A gamma ray detection unit for use on radioactive contaminated land or water-borne vehicles for directionally indicating a source of gamma ray radiation in the two forward quarters of the horizon with respect to said vehicle and for indicating the present and intensity of radioactive fallout on said vehicle comprising, in combination:

a radiation detector unit consisting of two gamma ray sensing elements, said unit being mounted well forward and high on said vehicle;

an indicating means for registering the presence of radioactive radiation, said indicating means being located at a point in said vehicle remote from said detector unit;

electric cable means connecting said detector unit to said indicating means;

comparatively massive shielding means associated with said sensing elements whereby each of said elements is responsive only to a source of radioactive radiation situated in one forward quadrant of the horizon and is not responsive to radioactive radiations emanating from said vehicle; and a plurality of radiation permeable cover means covering said sensing elements and said shielding.

2. A directional gamma ray detection unit for use with radioactive contaminated land or water-borne vehicles comprising, in combination:

a radiation detector unit consisting of two gamma ray sensing elements, said unit being mounted well forward and high on the longitudinal center line of said vehicle;

indicating means connected with said sensing elements for registering the presence and amount of radioactive radiation ahead of said vehicle; and comparatively massive shielding means associated with said sensing elements whereby each of said elements is responsive only to a source of radioactive radiation situated in one forward quadrant of the horizon and is not responsive to radioactive radiations emanating from said vehicle or the other of said forward quadrants of the horizon, said shielding means consisting of a massive horizontal base shield supporting said sensing elements, a fore-and-aft shield mounted on the center line of said vehicle between said sensing elements and supported by said base shield, and a transverse shield mounted on said base shield behind said sensing elements.

3. A directional gamma ray detection unit as claimed in claim 2 wherein said indicating means include a preamplifier having a sensitivity control whereby said indicating means may be adjusted to operate in a plurality of ranges from a defined minimum to a maximum of intensity expressed in mr./hr.

4. A radioactive radiation detection unit for use on radioactive contaminated land or waterborne surface vehicles for indicating a source of radiation in the land or water surface ahead of said vehicle and the presence of radioactive fallout from said source on the upper portions of said vehicle comprising, in combination:

A radiation detector unit consisting of two gamma ray sensing elements, said unit being mounted well forward and high on the longitudinal center line of said vehicle;

indicating means connected with said sensing elements for registering the presence and amount of radioactive radiation ahead of and on said vehicle;

comparatively massive shielding means associated with said sensing elements whereby each of said elements is responsive only to radioactive fallout and to said source of radiation located in one forward quadrant of the horizontal surface being traversed by said vehicle and is not responsive to radioactive radiations emanating from the lower portions of said vehicle or the other of said forward quadrants of the said horizontal surface, said shielding means consisting of a massive horizontal base shield supporting said sensing elements, a fore-and-aft shield mounted on the center line of said vehicle between said sensing elements and supported by said base shield, and a transverse shield mounted on said base shield behind said sensing elements; and radiation permeable cover means associated with said sensing elements for distinguishing, in connection with said indicating means, between the radiations received directly from said source of radioactive radiations in the horizontal surface ahead of said vehicle and the radiations emanating from the radioactive fallout on the upper portions of said vehicle.

5. A radioactive radiation detection unit as claimed in claim 4 further characterized by said horizontal base shield being of such suitable size and shape so as to positively shield said sensing elements from spurious radiations emanating from the contaminated lower portions of said vehicle.

6. A radioactive radiation detection unit as claimed in claim 4 further characterized by said cover means comprising a first removable substantial radiation-permeable dome-like cover adapted to hold its dome-like shape and to surround said sensing elements and said shielding means; a second plurality of thin radiation-permeable removable covers adapted to fit over said first cover and each other; and clamping means adapted to temporarily secure said covers to said horizontal base shield whereby radioactive particles from any source are denied access to said sensing elements.

References Cited in the file of this patent

UNITED STATES PATENTS

| | | |
|---|---|---|
| 2,562,929 | Lord et al. | Aug. 7, 1951 |
| 2,656,471 | Herzog | Oct. 20, 1953 |
| 2,767,326 | Stratford | Oct. 16, 1956 |
| 2,830,187 | Scherbatskoy | Apr. 8, 1958 |
| 2,836,726 | Rich | May 27, 1958 |

OTHER REFERENCES

Theory and Operation of Geiger-Mueller Counters, II, by Brown, Nucleonics, August 1948, pages 50 to 64.